(12) United States Patent
Beck

(10) Patent No.: US 7,169,842 B2
(45) Date of Patent: Jan. 30, 2007

(54) ELASTOMER COMPOSITIONS FOR USE IN A HYDROCARBON RESISTANT HOSE

(75) Inventor: Harold D. Beck, Strafford, MO (US)

(73) Assignee: Dayco Products, LLC, Miamisburg, OH (US)

( * ) Notice: Subject to any disclaimer, the term of this patent is extended or adjusted under 35 U.S.C. 154(b) by 259 days.

(21) Appl. No.: 10/830,760

(22) Filed: Apr. 21, 2004

(65) Prior Publication Data

US 2005/0059764 A1   Mar. 17, 2005

Related U.S. Application Data

(63) Continuation-in-part of application No. 10/663,324, filed on Sep. 15, 2003.

(51) Int. Cl.
*C08L 31/04*   (2006.01)

(52) U.S. Cl. ........................... 524/524; 524/114

(58) Field of Classification Search ............... 524/524, 524/114
See application file for complete search history.

(56) References Cited

U.S. PATENT DOCUMENTS

| | | | |
|---|---|---|---|
| 3,944,453 A | 3/1976 | Chudgar et al. | |
| 4,057,610 A | 11/1977 | Goettler et al. | |
| 4,261,390 A | 4/1981 | Belofsky | |
| 4,734,305 A | 3/1988 | Sugimoto et al. | |
| 4,842,024 A | 6/1989 | Palinchak | |
| 4,870,995 A | 10/1989 | Igarashi et al. | |
| 4,905,734 A | 3/1990 | Ito | |
| 4,905,735 A | 3/1990 | Akiyoshi | |
| 5,223,571 A * | 6/1993 | Igarashi et al. | ............... 525/58 |
| 5,373,870 A | 12/1994 | Derroire et al. | |
| 6,605,327 B1 | 8/2003 | Ramey et al. | |

OTHER PUBLICATIONS

Keller, Dale R., The use of enhanced viscosity ethylene vinyl acetate polymers for extruded goods applications, 1999, Paper No. 187, Bayer Corporation, Akron, Ohio.
Rohde, Ernst, Eva elastomers-applications and opportunities for industrial rubber goods, Rubber World, 36-40, 58, May 1993.
Keller, Dale R., Enhanced viscosity Levapren polymers in hose applications, 1999, Technical Information-Rubber Business Group, Bayer Corporation, Akron, Ohio.
Meisenheimer, Levapren Trial Product KA8784, 1998, Technical Information-Rubber Business Gruop, Bayer AG, Leverhusen, Germany.

* cited by examiner

*Primary Examiner*—Peter D. Mulcahy
(74) *Attorney, Agent, or Firm*—Joseph V. Tassone; J. Daniel Lykins

(57) ABSTRACT

A heat tolerant, pressure resistant elastomeric composition comprising a blend of a first ethylene-vinyl ester copolymer and a second copolymer selected from the group consisting of chlorosulfonated polyethylene (CSM), chlorinated polyethylene (CPE), polychloroprene (CR), ethylene-acrylic elastomer (AEM), alkyl-acrylate copolymer (ACM), polyvinyl acetate (PVA), nitrile-butadiene rubber (NBR), hydrogenated nitrile-butadiene rubber (HNBR), and mixtures thereof, a hose manufactured therefrom; and a method for preparing the hose are described.

10 Claims, No Drawings

ELASTOMER COMPOSITIONS FOR USE IN A HYDROCARBON RESISTANT HOSE

This application is a continuation-in-part of U.S. patent application Ser. No. 10/663,324 filed Sep. 15, 2003.

BACKGROUND OF THE INVENTION

The present invention relates generally to polymeric compositions. More particularly, the present invention relates to polymeric compositions useful in the manufacture of hoses for use in the automotive industry.

Hoses, particularly rubber hoses, are used in a variety of applications in the automotive industry as fuel feed hoses, torque converter hoses, power steering hoses and air conditioner hoses; as well as for industrial and household utility applications such as hydraulic hoses, refrigeration hoses, washing machine hoses, propane gas feed hoses, high pressure air hoses, garden hoses, etc.

It is generally known that rubber surfaces do not always exhibit desired resistance against chemical loads such as organic gases and solvents. Therefore, other approaches for improving the organic gas and solvent resistance of rubber materials included using rubber materials which have a different polarity than the organic gas or solvent, increasing the crosslinking of the rubber material, adding or increasing certain additives, and increasing the wall thickness of the rubber tube material. All of these approaches have a down side. For example, the use of a rubber material having a polarity different from the organic gas or solvent requires the use of more expensive rubber materials such as chloroprene rubber, acrylic rubber, epichlorohydrin rubber, and the like; increasing the degree of crosslinking of the rubber used detracts from the softness and flexibility of the rubber; the addition of additives affects the processability and certain physical properties of the rubber; and increasing the wall thickness of the rubber material also increases the weight of the structure. Generally, these undesirable effects overshadow any advantage gained in the improved gas and solvent resistance.

In order to improve the impermeability of multilayered rubber hoses, typical approaches include the use of a metal film as a barrier layer coated on one of the inner layers. Such disclosures appear, for example, in U.S. Pat. No. 318,458 to Fletcher where there is disclosed a multilane tubular structure made from India rubber and having a tin foil liner. Other prior art patents such as U.S. Pat. No. 4,559,793 to Hanes et al.; U.S. Pat. No. 4,759,455 to Campbell et al.; U.S. Pat. No. 5,182,147 to Davis; U.S. Pat. No. 5,271,977 to Yoshikawa et al; U.S. Pat. No. 5,360,037 to Lindstrom; U.S. Pat. No. 5,398,729 to Spurgat; and U.S. Pat. No. 5,476,121 to Yoshikawa et al. have attempted similar methods to reduce the permeability of fluids and/or gases through various tubes. Commonly assigned U.S. Pat. No. 6,074,717 to Little et al.; and U.S. Pat. Nos. 4,779,673 and 5,488,975 to Chiles et al. disclose metal coated synthetic rubber hoses used for circulation of fluids in radiant heating systems in houses and in businesses and disclose the use of an inner nylon tubular layer having a metal layer surrounding the nylon layer.

Polymeric material used to form the hose for accommodating fluids and gases under elevated pressures and/or high temperatures such as in automotive air conditioner cooler hoses and power steering hoses must meet other critical requirements. For example, the polymeric material must exhibit low permeability to FREON or other coolant gases to prevent such gases from escaping from the hose. Also such polymeric hose must be able to prevent outside moisture from entering the interior of the hose where it could contaminate the fluid or gas. In addition, the polymeric hose must be capable of withstanding high heat and pressure, be able to withstand engine and impact vibration, and be capable of forming gas-tight connections.

In the case of hoses for accommodating coolant fluid for automotive air conditioners, etc., polymeric materials such as polychloroprene (CR), acrylonitrile-butadiene rubber (NBR), chlorosulfonated polyethylene (CSM), chlorinated polyethylene (CPE), polyacrylate (PA), ethylene-acrylic rubber (AEM), alkyl acrylate copolymer (ACM), polyvinyl acetate, acrylonitrile-butadiene rubber (NBR), hydrogenated acrylonitrile-butadiene rubber (HNBR), ethylene-propylene-diene terpolymer (EPDM), cis-polybutadiene, cis-polyisoprene, polyurethane, polyamides such as nylon are often used as the material for forming the hose. For example, nylon 6 and nylon 66 are very low in coolant gas permeability, but are relatively high in moisture permeability. On the other hand, nylon 11 and 12 are relatively low in moisture permeability and less susceptible to hydrolysis, but are moderately high in gas permeability. Blends of any of the various nylons with other nylons, olefins or other materials are also used in such applications. For example, blends such as nylon 6, nylon 4, nylon 66, nylon 11, nylon 12, have been made to take advantage of desirable characteristics of one or more of such nylons and, at the same time, reduce the effects of any undesirable characteristics. However, blending the various polymeric material for the purpose of obtaining the desired benefits of each individual component actually acts to reduce the desired benefit because of the dilution effect of the other component(s) employed. Therefore, while one can obtain a variety of benefits by blending various polymers, the actual observed benefits may be reduced.

Ethylene-vinyl acetate copolymer (VAE) compositions are known. For example, U.S. Pat. Nos. 4,338,227 6,492, 454; 5,942,580; 5,837,791; 5,830,941; 5,807,948; 5,744, 566; 5,698,651; 5,362,533; 5,135,988; 4,338,227 and 4,309, 332 describe various ethylene-vinyl acetate copolymers and the uses thereof. Copolymers of ethylene and vinyl acetate exhibit elastomeric characteristics and are commonly used to improve adhesion properties of hot melt, solvent-based and pressure-sensitive adhesives. It is generally well known that the use of ethylene-vinyl acetate copolymers in the automotive industry and commercial applications are mostly limited to coatings, adhesives, gaskets, O-rings and the like. For example, "Ultrathene", a series of ethylene-vinyl acetate copolymers manufactured by Quantum Chemical, is typically used for adhesives, conversion coatings and thermoplastic modifiers. Such EVA copolymers exhibit a wide range of melt indexes. Ethylene-vinyl acetate copolymers are also marketed by Bayer under the trade name "Levapren". These EVA copolymers are described as oil and heat resistant materials which may be used in air hose applications. U.S. Pat. No. 6,605,327 to Ramey et al. teaches the use of two separate layers of an ethylene-vinyl copolymer in the manufacture of a multilayer hose.

Blends of vinyl esters with other polymers have been found to be somewhat effective in the manufacture of automotive hoses. For example, blends of ethylene-vinyl acetate with ethylene-vinyl acetate-carbon monoxide terpolymers are useful in applications were flame retardant, low smoke, oil resistant flexible systems are desirable as coatings such as coatings for wire and cable construction, are described in U.S. Pat. No. 6,133,367 to Arhart. However, there is no mention in the prior art of blends of a first vinyl ester with second copolymer selected from the group consisting of chlorosulfonated polyethylene (CSM), chlorinated polyethylene (CPE), polychloroprene (CR), acrylonitrile-butadiene rubber (NBR), polyacrylate (PA), ethylene-acrylic rubber (AEM), alkyl acrylate copolymer (ACM), polyvinyl acetate, acrylonitrile-butadiene rubber (NBR), hydrogenated acrylonitrile-butadiene rubber (HNBR), ethylene-propylene-diene terpolymer (EPDM), cis-polybutadiene, cis-polyisoprene.

Ethylene-vinyl acetate copolymers and blends thereof have been employed in the wire and cable industry as a sheath or cover material surrounding electrical wires. For example, polymeric blends of ethylene-vinyl acetate copolymers with ethylene-vinyl acetate-carbon monoxide terpolymers which are particularly useful in applications where flame retardant, low smoke, oil resistant, flexible systems are desirable as a wire coating. Patents disclosing the use of ethylene-vinyl acetate copolymers as wire and cable coatings include U.S. Pat. No. 4,349,605 to Biggs et al.; U.S. Pat. No. 4,381,326 to Biggs et al; U.S. Pat. No. 4,477,523 to Biggs et al.; U.S. Pat. No. 5,191,004 to Maringer et al.; U.S. Pat. No. 5,225,460 to Maringer et al.; and U.S. Pat. No. 5,226,489 to Maringer et al. None of the references describe a self supporting tubular structure, nor is there any teaching of a blend of a first vinyl ester and a second copolymer selected from the group consisting of polychloroprene (CR), acrylonitrile-butadiene rubber (NBR), chlorosulfonated polyethylene (CSM), chlorinated polyethylene (CPE), polyacrylate (PA), ethylene-acrylic rubber (AEM), alkyl acrylate copolymer (ACM), polyvinyl acetate, hydrogenated acrylonitrile-butadiene rubber (HNBR), ethylene-propylene-diene terpolymer (EPDM), cis-polybutadiene, cis-polyisoprene.

Choosing the right material or combination of materials to be used in the construction of automotive hoses is becoming more and more difficult because the hoses are now required to withstand higher pressures and temperatures than previous hoses performing the same tasks. Also mandated regulations require that the hoses exhibit greater impermeability rates and resist stress over longer periods of time while maintaining manufacturing costs at an acceptable level. Therefore, the manufacturers of automotive hoses find it necessary to come up with newer and better materials and combinations of materials to meet these rising needs. In order to achieve a material which meets regulations and still retains the many desirable characteristics necessary to satisfy the manufacturer, attempts have been made to blend various materials which individually exhibit the desirable characteristics. However, it is generally found that, while these blended composite materials may exhibit all of the desirable characteristics, these desirable characteristics have been drastically diluted to the point where the material is no longer acceptable.

Accordingly, in the manufacture of hoses for the automotive industry, it would be desirable to find a material blended from two or more individual polymers, each of which exhibits one or more desirable characteristics, wherein the individual characteristics in the resulting blend are not diluted by the other polymers.

SUMMARY OF THE INVENTION

It has now been found that blends of certain copolymers containing a blend of a first vinyl ester and at least one other polymer selected from the group consisting of ethylene-acrylic elastomer (AEM) and an alkyl-acrylate copolymer (ACM) or mixtures thereof, exhibit unexpected properties that are desirable in the manufacture of a variety of automotive hoses. For example, such blends exhibit high temperature and pressure resistance, improved tensile strength, and improved hydrocarbon fluid resistance. The particular copolymer blends of the present invention have been found to be particularly effective in forming hoses useful in the transmission of various automotive fluids and gases, e.g., engine oil cooler fluids, transmission oil cooler fluids, power steering fluids, radiator fluids, heater fluids, and the like. For example, blends containing a first vinyl ester of a $C_2$ to $C_6$ carboxylic acid, e.g., vinyl acetate, and a second polymer such as an ethylene-acrylic elastomer (AEM), an alkyl-acrylate copolymer (ACM), or mixtures thereof not only exhibit high temperature and pressure resistance, tensile strength, and improved hydrocarbon fluid resistance, but such blends appear to preserve the individual characteristics of each of the copolymer components of the blend.

Typically, ethylene-vinyl acetate copolymers are known to be heat resistant elastomers which are only fairly resistant to common fluids such as transmission fluids and power steering fluids. In order to improve the oil resistance of an ethylene-vinyl acetate copolymer material, one approach would be to blend an oil resistant polymer with the ethylene-vinyl acetate copolymer. Some of the more common oil resistant polymers would include chlorosulfonated polyethylene (CSM), chlorinated polyethylene (CPE), polychloroprene (CR), polyvinyl acetate (PVA), nitrile-butadiene rubber (NBR), hydrogenated nitrile-butadiene rubber (HNBR), and the like. However, the blending of certain of these materials with vinyl acetate to obtain the beneficial characteristics of each material, more often than not, is only marginally successful, because the blending of the two materials simply dilutes their characteristics in the blend as compared to the individual components alone. The diluted characteristics of the blended material generally are most apparent when the material is aged.

It has now been discovered that blends of an ethylene-vinyl ester, e.g., vinyl acetate, with certain other polymers, particularly, ethylene-acrylic elastomers (AEM), alkyl-acrylate copolymer (ACM), or mixtures thereof, not only provide a material for use in the manufacture of hoses which meet government standards with regard to permeability rates, has good tensile strength, has good oil resistance, and has good heat and pressure resistance, but such blends, unexpectedly, do not show the typical effects of dilution. Such blends exhibit desirable characteristics which are nearly comparable to the same desirable characteristics obtained from the individual components when used alone.

In one aspect of the invention, there is provided a heat tolerant, pressure resistant composition which exhibits improved hydrocarbon fluid impermeability. The heat tolerant, pressure resistant composition of the invention comprises a blend of a first copolymer and a second polymer wherein the first copolymer is different from the second polymer. The first copolymer comprises an ethylene-vinyl ester of a lower carboxylic acid and the second polymer is one selected from the group consisting of ethylene-acrylic elastomer (AEM), alkyl-acrylate copolymer (ACM), and the like, and mixtures thereof.

In another aspect of the invention, there is provided a hose especially useful if the automotive industry to transport fuel, oil and various fluids. The hose of the present invention is manufactured from a blend of a first vinyl ester copolymer and a second polymer selected from the group consisting of ethylene-acrylic elastomer (AEM), alkyl-acrylate copolymer (ACM), and the like, and mixtures thereof. The resulting hose exhibits excellent oil resistance, fuel impermeability, temperature and pressure resistance, and tensile strength.

In still another aspect of the invention, there is provided a method for manufacturing the hose of the present invention which comprises providing a first vinyl ester copolymer, providing a second polymer selected from the group consisting of ethylene-acrylic elastomer (AEM), alkyl-acrylate copolymer (ACM), and the like, and mixtures thereof, blending the first vinyl ester with the second polymer, forming a hose from said blend, and vulcanizing the hose.

DETAILED DESCRIPTION OF THE INVENTION

In accordance with the invention, the first copolymer comprises a vinyl ester of a $C_2$ to $C_6$ lower aliphatic carboxylic acid. Preferably, the vinyl ester is an ethylene-vinyl acetate wherein the vinyl-acetate copolymer contains about 40 to 80 weight percent vinyl acetate. Vinyl-acetate copolymers commercially available from Bayer Corporation under the name Levapren has been found to be particularly satisfactory as the first vinyl ester copolymer of the blend used in manufacturing the hose of the present invention. The vinyl ester is blended with a second polymer selected from the group consisting of ethylene-acrylic elastomer (AEM), alkyl-acrylate copolymer (ACM), and the like and mixtures thereof. In a preferred aspect of the invention, the second polymer is an ethylene-acrylic elastomer (AEM), an alkyl-acrylate copolymer (ACM) or mixtures thereof. Most preferably, the second polymer is an ethylene-acrylic elastomer available from E.I. DuPont under the name Varnac.

Additional materials may also be employed as additives compounded into the copolymer composition for the purpose of providing desired characteristics of the composition. These additional materials include, for example, process aids in an amount up to about 8%; fillers in an amount of about 20 to 60%; plasticizers in an amount up to about 15%, preferably about 3 to 15%; metal oxides or hydroxides in an amount up about 8%; peroxides in an amount up to about 5%; coagents in amount up to about 5%, and antioxidants in an amount up to about 5%. Other additives such as vulcanization accelerators commonly used in polymeric compositions for use in preparing hoses may be added in appropriate amounts to provide their desired effect.

Suitable processing aids includes stearic acid, stearates, polyethylene, amines, oils, organic esters, organic phosphate esters and the like.

Suitable Fillers include materials, such as carbon black, silicon dioxide, fumed silica, precipitated silica, diatomaceous earth, magnesium carbonate, magnesium silicate, aluminum silicate titanium dioxide, talc, mica, aluminum sulfate, calcium sulfate, graphite, wollastonite, molybdenum disulfide, clay, calcium carbonate and combinations thereof.

Suitable plasticizers include materials such as hydrocarbons, glycols, aldehydes, ethers, esters, ether-esters, and the like.

Suitable metal oxides and metal hydroxides include zinc oxide, zinc hydroxide, magnesium oxide, magnesium hydroxide, calcium oxide, calcium hydroxide, aluminum hydroxide, and the like.

Suitable peroxides include 2,5-dimethyl-2,5-di(t-butylperoxy)hexyne-3; 2,5-dimethyl-2,5-di(t-butylperoxy)hexane; α,α'-bis-(t-butylperoxy)-p-diisopropylbenzene, dicumyl peroxide, di-t-butyl peroxide; 1,1-bis(t-butylperoxy)-3,3,3-trimethylcyclohexane; 2,4-dichlorobenzoyl peroxide; benzoyl peroxide; p-chlorobenzoyl peroxide; 4,4-bis(t-butylperoxy)valerate; t-butylcumyl peroxide; di-t-amyl peroxide; t-butyl hydroperoxide and combinations thereof. Image Page 2

Suitable coagents include N,N',m-Phenylenedimaleimide (HVA2) and other bismaleimides; triallyl cyanurate; tiallyl isocyanurate; diallyl terephthalate; 1,2-vinyl polybutadienes; di- and tri-functional methacrylates and diacrylates; and metal lion versions of these coagents.

Suitable Antioxidants include phenols, hydrocinnamates, diphenylamines, hydroquinone, hydroquinolines, mercaptobenzimidazoles, and the like.

The composition of the invention is particularly advantageous in the manufacture of tubular structures for use in the automotive industry, for example, for transporting fuel and other automotive fluids such as those fluids useful in engine oil coolers, transmission oil coolers, power transmission coolers, radiators, heaters, etc.

Hoses manufactured from the composition of the present invention not only exhibit good heat tolerance, pressure resistance and hydrocarbon impermeability, but such hoses unexpectedly retain such desired heat tolerance, pressure resistance, and hydrocarbon impermeability characteristics at a surprising effective level over long periods of time, even after aging.

In a third embodiment of the invention, a method for manufacturing heat tolerant, pressure resistant hoses having improved hydrocarbon fluid resistance is provided. The method includes providing an elastomeric composition comprising a first copolymer and a second polymer wherein said first copolymer is different from said second polymer, said first copolymer comprising an ethylene-vinyl ester of a $C_1$ to $C_6$ lower carboxylic acid and a said second polymer selected from the group consisting of ethylene-acrylic elastomer (AEM), alkyl-acrylate copolymer (ACM), and mixtures thereof; incorporating into said elastomeric composition, one or more additives selected from the group consisting of process aids, fillers, plasticizers, metal oxides, metal hydroxides, peroxides, coagents, antioxidants and combinations thereof;

forming a hose of the blend containing the additives; and vulcanizing the hose in an autoclave.

In a preferred method for manufacturing the tubular structure of the invention, a continuous spiral production method is employed which comprises providing an inner layer of a material produced in a mono-extrusion of an annular configuration.

A reinforcement material is generally employed in the manufacture of the hose to provide strength to the hose structure. The reinforcement materials include natural fibers such as cotton; synthetic fibers such as polyester, nylon, rayon, aramid; and metal wire. The reinforcement may be applied by knit or maypole type braid methods. Typically, the reinforcement material is applied to the annular extrudate in a two-layer spiral format in which one layer is applied in a clockwise direction and the other layer is applied in a counter-clockwise direction.

An outer protective cover layer may be employed over the reinforcement layer in a mono-extrusion of an annular configuration to provide to protect the hose from the outer environment. The cover layer is a protective layer of any of the commercially recognized materials for such use, e.g., elastomers, thermoplastic polymers, thermosetting polymers and the like. Typically, the protective cover is a synthetic elastomer having good heat resistance, oil resistance, weather resistance and flame resistance. Preferably, the outer protective covery layer is a synthetic elastomer selected from the group consisting of styrene-butadiene rubber; butadiene-nitrile rubber such as butadiene-acrylonitrile rubber; chlorinated rubber; chlorosulfonated polyethylene; vinylethylene-acrylic rubber; acrylic rubber; epichlorohydrin rubber such as Hydrin 200, a copolymer of epichlorohydrin and ethylene oxide available from DuPont ECO; polychloroprene rubber; polyvinyl chloride; ethylene-propylene copolymers; ethylene-propylene-diene terpolymers; ultra high molecular weight polyethylene; high density polyethylene; and blends thereof.

The hose of the invention is particularly useful in the transportation of air conditioner fluids, power steering fluids, transmission oil cooler fluids, etc. where the material forming the hose exhibits the required heat tolerance, pressure resistance, impermeability resistance to the fluid being transported through the hose, etc.

EXAMPLES

Example 1

| Parts per hundred of polymer (phr) | | | | |
|---|---|---|---|---|
| Levapren ® 500 HV | 100 | 80 | 90 | 90 |
| Hypalon ® 4085 (CSM) | | 10 | 10 | |
| Tyrin ® CM0136 (CPE) | | 10 | | 10 |
| Stearic Acid | 1 | 1 | 1 | 1 |
| Magnesium Oxide | 10 | 10 | 10 | 10 |
| N650 Carbon Black | 75 | 75 | 75 | 75 |
| Silicon Dioxide | 5 | 5 | 5 | 5 |
| Trioctyl Trimellitate | 10 | 10 | 10 | 10 |
| 1-Octadecanamine | 1 | 1 | 1 | 1 |
| Triallyl Cyanurate, 72% Dispersion | 1 | 1 | 1 | 1 |
| N,N'-m-Phenylene Dimaleimide | 1 | 1 | 1 | 1 |
| Dicumyl Peroxide; 60% Active | 4 | 4 | 4 | 4 |
| 4,4'-Di(methylbenzyl)diphenylamine | 2 | 2 | 2 | 2 |
| Polyethylene | 2 | 2 | 2 | 2 |
| Polyethylene Glycol | 2 | 2 | 2 | 2 |
| Cured 20 minutes @ 175° C. | | | | |
| Original Properties | | | | |
| Tensile Strength; psi | 1699 | 2083 | 2059 | 1873 |
| Elongation % | 242 | 195 | 213 | 243 |
| 100% Modulus; psi | 785 | 1187 | 1074 | 923 |
| Hardness; Shore A | 77 | 79 | 79 | 79 |
| Compression Set, 70 h. @ 175° C. | 48 | 73 | 58 | 51 |
| After 336 hours @ 175° C. in Air | | | | |
| Tensile Strength; psi | 1497 | 1993 | 2514 | 2114 |
| Elongation % | 136 | 1 | 14 | 24 |
| 100% Modulus; psi | 1407 | n/a | n/a | n/a |
| Hardness; Shore A | 54 | 47 | 47 | 43 |
| After 70 hours @ 175° C. in Chrysler MS9602 Automatic Transmission Fluid | | | | |
| Tensile Strength; psi | 1455 | 986 | 1153 | 1099 |
| Elongation % | 274 | 116 | 149 | 175 |
| 100% Modulus; psi | 446 | 813 | 670 | 480 |
| Hardness; Shore A | 54 | 47 | 47 | 43 |
| Volume Change; % | 29 | 52 | 51 | 53 |

Levapren is a trademark of Bayer Corporation
Hypalon is a trademark of DuPont Dow Elastomers
Tyrin is a trademark of DuPont Dow Elastomers

Example 2

| Parts per hundred of polymer (phr) | | | | | | | | | |
|---|---|---|---|---|---|---|---|---|---|
| Levapren ® 600 HV | 100 | 75 | 50 | 25 | | 75 | 50 | 25 | |
| Vamac ® PE 2166 | | 25 | 50 | 75 | 100 | | | | |
| Vamac ® DLS | | | | | | 25 | 50 | 75 | 100 |
| Stearic Acid | 1 | 1 | 1 | 1 | 1 | 1 | 1 | 1 | 1 |
| Magnesium Oxide | 10 | 10 | 10 | 10 | 10 | 10 | 10 | 10 | 10 |
| N650 Carbon Black | 70 | 70 | 70 | 70 | 70 | 70 | 70 | 70 | 70 |
| Silicon Dioxide | 5 | 5 | 5 | 5 | 5 | 5 | 5 | 5 | 5 |
| Trioctyl Trimellitate | 7.5 | 7.5 | 7.5 | 7.5 | 7.5 | 7.5 | 7.5 | 7.5 | 7.5 |
| Adipate Plasticizer | 2.5 | 2.5 | 2.5 | 2.5 | 2.5 | 2.5 | 2.5 | 2.5 | 2.5 |
| 1-Octadecanamine | 1 | 1 | 1 | 1 | 1 | 1 | 1 | 1 | 1 |
| Poly(oxy-1,2-ethanediyl), alpha-octadecyl-omega-hydroxy,-phosphate | 1 | 1 | 1 | 1 | 1 | 1 | 1 | 1 | 1 |
| Triallyl Cyanurate, 72% Dispersion | 1 | 1 | 1 | 1 | 1 | 1 | 1 | 1 | 1 |
| N,N'-m-Phenylene Dimaleimide | 1 | 1 | 1 | 1 | 1 | 1 | 1 | 1 | 1 |
| Dicumyl Peroxide; 99% | 2.4 | 2.4 | 2.4 | 2.4 | 2.4 | 2.4 | 2.4 | 2.4 | 2.4 |
| 4,4'-Di(methylbenzyl)diphenylamine | 2 | 2 | 2 | 2 | 2 | 2 | 2 | 2 | 2 |
| Cured 20 minutes @ 175° C. | | | | | | | | | |
| Original Properties | | | | | | | | | |
| Tensile Strength; psi | 1806 | 1702 | 1486 | 1361 | 1054 | 1664 | 1482 | 1336 | 997 |
| Elongation % | 289 | 284 | 282 | 294 | 316 | 282 | 253 | 306 | 373 |
| 100% Modulus; psi | 761 | 691 | 662 | 632 | 527 | 670 | 643 | 583 | 381 |
| Hardness; Shore A | 78 | 79 | 81 | 79 | 79 | 78 | 76 | 75 | 73 |
| Compression Set, 70 h. @ 175° C. | 49 | 62 | 67 | 73 | 76 | 66 | 71 | 80 | 90 |
| After 168 hours @ 150° C. in Air | | | | | | | | | |
| Tensile Strength; psi | 1645 | 1432 | 1200 | 1045 | 929 | 1588 | 1501 | 1421 | 1149 |
| Elongation % | 285 | 311 | 332 | 300 | 336 | 293 | 240 | 271 | 336 |
| 100% Modulus; psi | 925 | 863 | 782 | 689 | 689 | 924 | 905 | 954 | 735 |
| Hardness; Shore A | 83 | 84 | 85 | 90 | 90 | 86 | 84 | 86 | 83 |

-continued

| | | | | | | | | |
|---|---|---|---|---|---|---|---|---|
| After 70 hours @ 175° C. in Air | | | | | | | | |
| Tensile Strength; psi | 1584 | 1477 | 1305 | 1186 | 1010 | 1587 | 1543 | 1493 | 1168 |
| Elongation % | 286 | 261 | 290 | 298 | 317 | 276 | 240 | 249 | 295 |
| 100% Modulus; psi | 1041 | 1048 | 954 | 918 | 803 | 1008 | 1039 | 1123 | 830 |
| Hardness; Shore A | 87 | 90 | 91 | 91 | 92 | 88 | 88 | 88 | 90 |
| After 336 hours @ 175° C. in Air | | | | | | | | |
| Tensile Strength; psi | 1733 | 1844 | 1808 | 1531 | 1409 | Not Tested | Not Tested | Not Tested | Not Tested |
| Elongation % | 93 | 117 | 118 | 136 | 155 | | | | |
| 100% Modulus; psi | 1453 | 1372 | 1324 | 1115 | 979 | | | | |
| Hardness; Shore A | 92 | 92 | 94 | 94 | 94 | | | | |
| After 70 hours @ 162.8° C. in Dexron ® III Automatic Transmission Fluid | | | | | | | | |
| Tensile Strength; psi | 1491 | 1419 | 1270 | 1220 | 989 | 1523 | 1502 | 1354 | 1124 |
| Elongation % | 280 | 252 | 283 | 273 | 318 | 280 | 276 | 271 | 324 |
| 100% Modulus; psi | 508 | 519 | 457 | 476 | 403 | 439 | 517 | 557 | 482 |
| Hardness; Shore A | 54 | 54 | 58 | 58 | 63 | 63 | 59 | 66 | 74 |
| Volume Change; % | 34 | 28 | 26 | 24 | 20 | 25 | 19 | 13 | 6 |
| After 70 hours @ 150° C. in IRM 903 Oil | | | | | | | | |
| Tensile Strength; psi | 1281 | 1266 | 1159 | 1065 | 852 | 1310 | 1255 | 1120 | 1015 |
| Elongation % | 193 | 185 | 199 | 225 | 255 | 204 | 221 | 232 | 308 |
| 100% Modulus; psi | 589 | 622 | 536 | 471 | 377 | 541 | 463 | 439 | 322 |
| Hardness; Shore A | 44 | 49 | 49 | 50 | 51 | 44 | 46 | 50 | 55 |
| Volume Change; % | 67 | 61 | 55 | 50 | 47 | 53 | 45 | 35 | 22 |

Levapren is a trademark of Bayer Corporation
Vamac is a trademark of E.I. du Pont de Nemours and Company, Inc.
Dexron is a trademark of General Motors Corporation While preferred embodiments of the invention have been described in detail and exemplified in the above examples and specification, it will be apparent to those skilled in the art that the invention may be modified without deviating from the scope of the invention. Therefore, the foregoing examples and description are to be considered exemplary rather than limiting and are not to be limited thereto.

What is claimed is:

1. A heat tolerant, pressure and hydrocarbon resistant, elastomeric, automotive hose composition exhibiting improved hydrocarbon fluid impermeability, said composition comprising:
    a blend of a first copolymer and a second copolymer wherein said first copolymer is an ethylene-vinyl ester of a $C_2$ to $C_6$ lower carboxlyic acid; and a said second copolymer is an ethylene-acrylic elastomer (AEM), an alkyl-acrylate copolymer (ACM) or a mixture thereof.

2. The composition of claim 1, wherein said first copolymer is an ethylene-vinyl acetate copolymer and said second copolymer is an ethylene-acrylate elastomer, an alkyl acrylate copolymer, or a mixture thereof.

3. The composition of claim 2, wherein said ethylene-vinyl acetate copolymer contains about 40 to 80 weight percent vinyl acetate.

4. The composition of claim 2, wherein said ethylene-vinyl acetate copolymer contains about 50 to 80 weight percent vinyl acetate.

5. The composition of claim 2, wherein said second copolymer is an ethylene-acrylic elastomer.

6. The composition of claim 5, wherein said blend contains about 10 to 90 weight percent vinyl acetate copolymer and about 90 to 10 weight percent ethylene-acrylic elastomer.

7. The composition of claim 1 further comprising 0 to about 75% by weight of an elastomeric polymer selected from the group consisting of chlorinated polyolefin, chlorosulfonated polyolefin, polychloroprene, polyvinyl acetate, acrylonitrile-butadiene rubber, hydrogenated acrylonitrile-butadiene rubber, ethylene-propylene diene terpolymer, styrene-butadiene rubber, ethylene-propylene rubber, butyl rubber, cis-polybutadiene, cis-polyisoprene, polyurethane and combinations thereof.

8. The composition of claim 1 further comprising about 25 to 75% by weight of one or more additives selected from the group consisting of process aids, fillers, plasticizers, metal oxides, metal hydroxides, peroxides, coagents, antioxidants and combinations thereof.

9. The composition of claim 8, wherein said one or more additives comprises:
    about 0 to 8% by weight one or more processing aids selected from the group consisting of stearic acid, stearates, 1-octanedecanamine, polyethylene, amines, oils, organic esters, organic phosphate esters and combinations thereof,
    about 20 to 60% by weight one or more fillers selected from the group consisting of carbon black, graphite, silicone dioxide, fumed silica, precipitated silica, diatomaceous earth, magnesium carbonate, calcium carbonate, magnesium silicate, aluminum silicate, titanium dioxide, talc, mica, aluminum sulfate, calcium sulfate, wollastonite, molybdenum disulfide, clay, calcium carbonate and combinations thereof
    about 3 to 15% by weight one or more plasticizers selected from the group consisting of hydrocarbons, glycols, aldehydes, ethers, esters, ether-ester, trioctyl trimellitate and combinations thereof,
    about 0 to 10% by weight one or more metal oxides and/or hydroxides selected from the group consisting of zinc oxide, zinc hydroxide, magnesium oxide, magnesium hydroxide, calcium oxide, calcium hydroxide, aluminum hydroxide and combinations thereof, about 0.5 to 4% by weight one or more peroxides selected from the group consisting of 2,5-dimethyl-2,5-di(t-butylperoxy)hexyne-3; 2,5-dimethyl-2,5-di(t-butylperoxy)hexane; α, α'-bis(t-bis(t-butylperoxy)-p-diisopropylbenzene; dicumyl peroxide; di-t-butyl peroxide; 1,1-bis(t-butylperoxy)3,3,5-trimethylcyclohexane; 2,4-dichlorobenzoyl peroxide; benzoyl peroxide; p-chlorobenzoyl peroxide; 4,4-bis(t-butylperoxy)valerate; t-butylcumyl peroxide; di-t-amyl peroxide; t-butyl hydroperoxide and combinations thereof;

about 0.25 to 5% by weight one or more coagents selected from the group consisting of maleimides, triallyl cyanurate, triallyl isocyanurate, diallyl terepbthalate, 1,2-vinyl polybutadiene, di- and tri-functional methacrylates, diacrylates, metal ion versions thereof and combinations thereof; and about 0 to 3% by weight one or more antioxidants selected from the group consisting of phenols, hydrocinnamates, hydroquinones, hydroquinolines, diphenylamines, mercaptobenzimidazoles and combinations thereof.

10. The composition of claim 9, wherein said composition comprises:

about 10 to 90% by weight of an ethylene-vinyl acetate copolyrner containing about 50 to 80% vinyl acetate;

about 90 to 10% by weight of an ethylene-acrylic elastomer;

about 0 to 75% by weight of an elastomeric polymer selected from the group consisting of chlorinated polyolefin, chlorosulfonated polyolefin, polychloroprene, polyvinyl acetate, acrylonitrile-butadiene rubber, hydrogenated acrylonitrile-butadiene rubber, ethylene-propylene diene terpolymer, styrene-butadiene rubber, ethylene-propylene rubber, butyl rubber, cis-polybutadiene, cis-polyisoprene, polyurethane, and combinations thereof:

about 0.2 to 0.7% by weight stearic acid;

about 23 to 38% by weight carbon black;

about 2 to 5% by weight silicon dioxide;

about 3 to 7% by weight trioctyl trimellitate;

about 0.5 to 7% by weight adipate type plasticizer;

about 0 to 8% by weight magnesium oxide;

about 0.1 to 0.75% by weight 1-octanedecanamine;

about 0.1 to 0.75% organic phosphate ester;

about 0.5 to 4% by weight organic peroxide;

about 0.25 to 1% by weight triallyl cyanurate;

about 0.25 to 1% by weight N,N', n-phenylenedimaleimide;

about 0.25 to 2% by weight antioxidant selected from the group consisting of phenols, hydrocinnamates, diphenylamines, hydroquinones, hydroquinolines and mixtures thereof.

* * * * *